Patented Mar. 9, 1926.

1,576,322

UNITED STATES PATENT OFFICE.

JOSEF HALLER, OF LEVERKUSEN, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZO DYE.

No Drawing.  Application filed November 7, 1925.  Serial No. 67,655.

*To all whom it may concern:*

Be it known that I, JOSEF HALLER, citizen of Germany, residing at Leverkusen, in the State of Prussia, Germany, have invented new and useful Improvements in Azo Dyes, of which the following is a specification.

I have invented new and useful improvements in azo dyestuffs from asymmetrical m-xylidin.

I have found that the azo dyestuffs which are obtained by coupling diazotized asymmetrical m-xylidin- compounds with 2-3 hydroxynaphthoic-acid arylids in which the aryl radicle is an asymmetrical m-xylidin compound have a distinctive superiority over similar dyestuffs such as obtained by coupling aromatic diazo compounds in general and diazotized m-xylidin in particular with the 2-3-hydroxynaphthoic acid anilid.

My new products are distinguished by fuller, clearer shades, with particular improved fastness to light and kier boiling when produced on vegetable fibres. They are obtained by diazotizing asymmetrical m-xylidin compounds, as for instance 1-3-dimethyl-4-aminobenzene, or 1-3-dimethyl-4-amino-6-nitrobenzene and coupling with 2-3-hydroxynaphthoic-acid-asymmetrical m-xylidid compounds. When this operation is produced on vegetable fibres, the latter become dyed a deep, clear red shade, of excellent fastness to light and kier boiling. In substance my new dyestuffs are deep red powders, practically insoluble in water, soluble in concentrated sulfuric acid with a violet color. By reduction with e. g. zinc and hydrochloric acid they yield an asymmetrical m-xylidin compound and an amino-2-3-hydroxynaphthoic-asymmetrical-m-xylidid.

To further illustrate my invention the following example is given:

10 gr. 2-3-hydroxy-naphthoic acid-asymmetrical-m-xylidid, are dissolved in 1 litre water containing 15 cc. caustic soda 34° Bé. and 10 cc. Turkey red oil.

A cotton hank is impregnated with this solution and squeezed out.

A diazo solution is then prepared by dissolving 2.5 gr. 1-3-dimethyl-4-aminobenzene in 400 cc. water containing 7 cc. concentrated hydrochloric acid. The solution is cooled by the addition of ice and diazotized with 14 cc. of a 10% sodium nitrite solution. Sodium acetate is added to make the reaction mixture weakly organic acid. The impregnated cotton hank is now worked in this diazo solution for 20 minutes, squeezed, rinsed and washed in a soap solution. The cotton is then dyed a full bluish-red shade of excellent fastness to light and kier boiling. The dyestuff precipitated on the fibre has most probably the formula

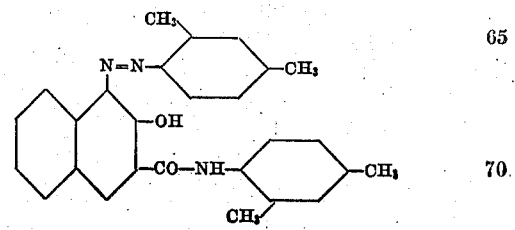

If a solution of 1-3-dimethyl-4-diazo-benzene as above obtained, is added to a solution of 2-3-hydroxynaphthoic acid-asymmetrical-m-xylidid in water to which the requisite amount of caustic alkali has been added, the coupling proceeds quite rapidly and the same dyestuff as obtained on the fibre is precipitated as a dark red powder, practically insoluble in water, soluble in concentrated sulfuric acid with a violet color. By reduction as for instance with zinc and hydrochloric acid it yields asymmetrical-m-xylidin and 1-amino-2-hydroxy-3-naphthoic acid-asymmetrical-m-xylidid.

The diazo compound from 6-nitro-4-amino-1-3-dimethylbenzene coupled with the 2-3-hydroxynaphthoic-arylid, produced from 6-nitro-4-amino-1-3-dimethylbenzene, produces on the fibre a more yellowish-red shade of the same excellent fastness.

I claim:

1. As new products azo dyestuffs of the general formula

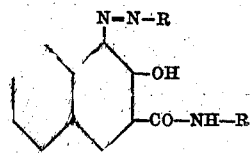

in which R is a 1-3-dimethylbenzene compound attached in position 4 to the combining nitrogen atoms, which are deep red powders, practically insoluble in water, soluble in concentrated sulfuric acid with violet color and yielding by reduction a 1-amino-2-hydroxy-3-naphthoic acid-asymmetrical-m-xylidid compound and an asymmetrical-m-xylidin compound.

2. As a new product the azo dyestuff having most probably the formula

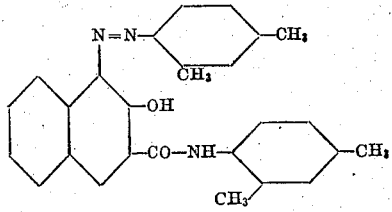

which is a deep red powder, practically insoluble in water, soluble in concentrated sulfuric acid with a violet color and yielding by reduction asymmetrical-m-xylidin and 1-amino-2-hydroxy-3-naphthoic acid-asymmetrical-m-xylidid.

3. As new products vegetable fibres dyed a deep red shade, exceedingly fast to light and kier boiling, with azo dyestuffs of the general formula

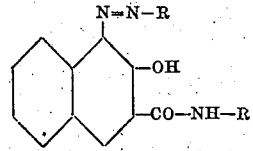

in which R is a 1-3-dimethylbenzene compound attached in position 4 to the combining nitrogen atom.

4. As new products cotton fibres dyed deep red shades exceedingly fast to light and kier boiling with the azo dyestuff of the probable formula

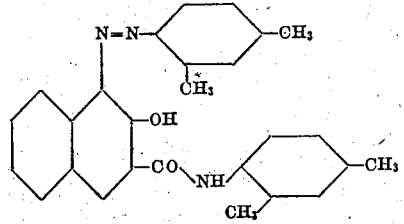

In testimony whereof I have hereunto set my hand.

JOSEF HALLER.